United States Patent [19]

Stamper

[11] 4,355,972
[45] Oct. 26, 1982

[54] TRAVELLING BAKING OVEN

[75] Inventor: John R. Stamper, Stamford, England

[73] Assignee: Baker Perkins Holdings Limited, Peterborough, England

[21] Appl. No.: 234,813

[22] Filed: Feb. 17, 1981

[30] Foreign Application Priority Data

Feb. 19, 1980 [GB] United Kingdom ............... 8005599

[51] Int. Cl.³ .......................... F27B 5/04; A23L 3/00; F27B 3/22
[52] U.S. Cl. .................................. 432/148; 99/362; 432/176; 432/202
[58] Field of Search ...................... 432/148, 176, 202; 99/362

[56] References Cited

U.S. PATENT DOCUMENTS 2,707,925  5/1955  Naylor ............................. 432/176
2,961,976 11/1960  Ooms ............................... 432/176
3,548,514 12/1970  Smith et al. ...................... 432/148

FOREIGN PATENT DOCUMENTS 628961  4/1936  Fed. Rep. of Germany ...... 432/176

Primary Examiner—John J. Camby
Attorney, Agent, or Firm—Learman & McCulloch

[57] ABSTRACT

In order to improve the thermal efficiency of a multizone, indirect-heated, travelling baking oven, with a closed-circuit gas heating system which heats at least the major part of the length of the oven and which includes at least two heaters which are spaced apart in the direction of gas flow in the heating system, the gas flow is passed along the bottom of the oven to adjacent the delivery end of the oven and then back along the top of the oven, the temperature generally falling throughout the circuit so that the maximum bottom heat is adjacent the input end of the oven and the maximum top heat is adjacent the delivery end of the oven.

7 Claims, 9 Drawing Figures

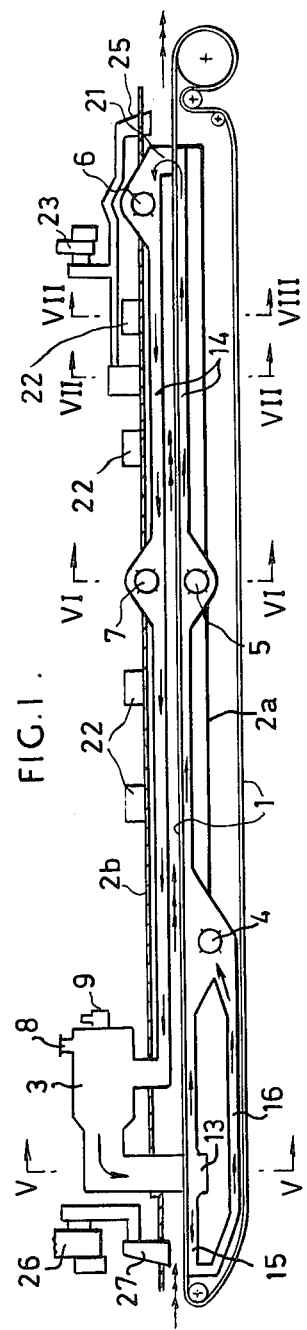
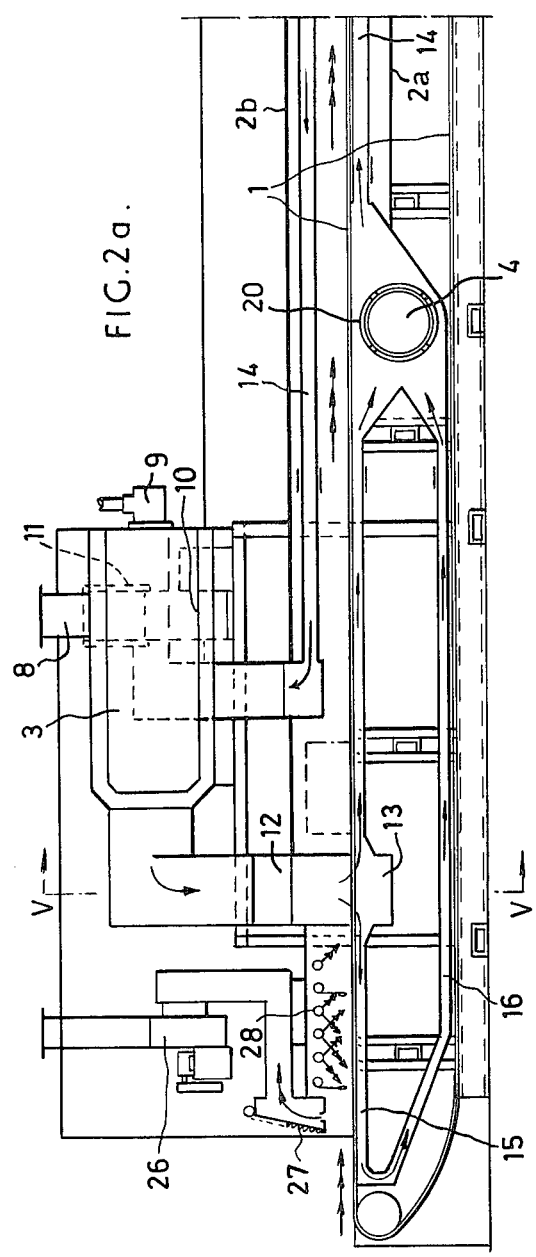

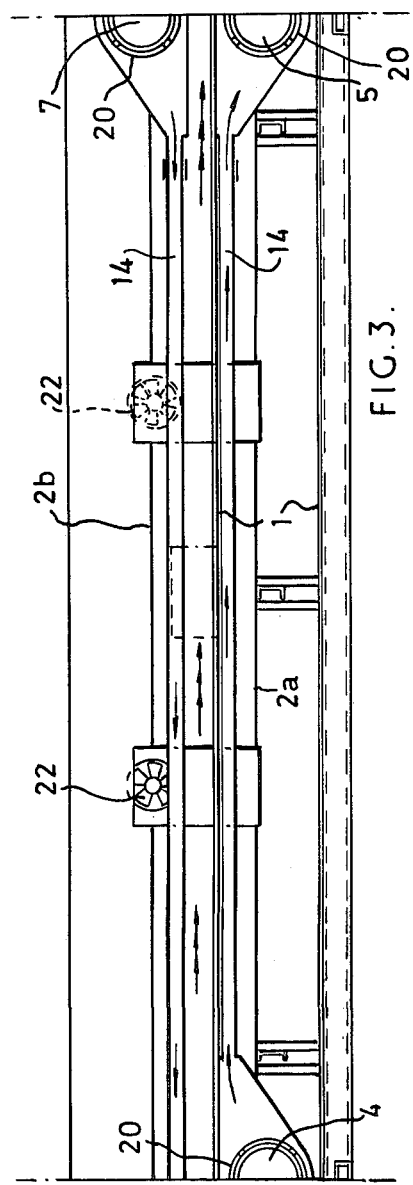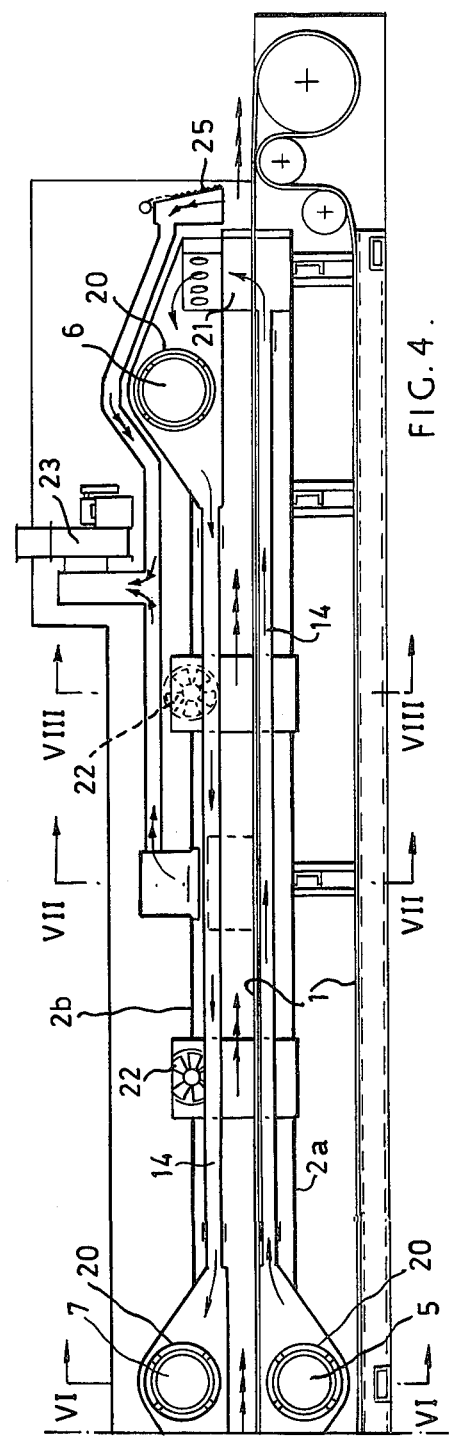

TRAVELLING BAKING OVEN

BACKGROUND OF THE INVENTION

The present invention relates to a multi-zone, indirect-heated, travelling baking oven, which can be for bakery products such as bread, cake or confectionery, (ie small cakes, tarts, etc) or for biscuits.

The term "multi-zone" means that there is not a uniform temperature or heat input throughout the length of the oven. For instance in bread making, a high heat input is used on the bottom in the first zone of the oven, for the development or rising of the bread, while a very low or zero heat input is required on the top, to keep the surface temperature as low as possible and prevent a skin forming so that expansion can take place at a high rate without splitting the bread—the baking tins or the conveyor prevent the bottom splitting; in the second zone a somewhat lower heat input is used on the bottom and the top heat input is less than that on the bottom but greater than the top input in the first zone, for drying the bread; in the third or last zone, a yet lower bottom heat input is required while the top input is somewhat higher, about equal to the bottom input, for caramelising or browning the crust of the bread. Very roughly, each zone can extend for a third of the length of the oven, but there is overlap of the zones and of the specific processes occurring in them. The same sort of heat or temperature control is required for the majority of bakery products, but not for all products. For instance, in making some biscuits, high heat is applied to the top and low heat to the bottom in the first zone.

In indirect heating, there is usually a closed-circuit gas heating system heated by a heater which in general terms can be of any suitable type, including electrical heaters or a combination of electrical heaters and burners, but in practice is usually gas or oil fired or gas/oil dual purpose; with such a burner, the combustion gases pass into the circuit and, usually immediately before the gas is returned to the burner, there is a bleed off of say 10% (by mass) of the gas flow—the system is known as the "cyclotherm" system.

A travelling oven has some way of passing products to be baked through the oven from the input end to the delivery end, usually in the form of a travelling conveyor for carrying the products either directly or in baking tins. The oven chamber can be very large, for instance about 30 meters long and 4 meters wide.

THE INVENTION

In the multi-zone, indirect-heated, travelling baking oven of the invention, there is a closed-circuit gas heating system which heats at least the major part of the length of the oven and has at least two heaters which are spaced apart in the direction of gas flow. The gas flows along the bottom of the oven to adjacent the delivery end and then back along the top of the oven and the temperature generally falls throughout the circuit so that the maximum bottom heat is adjacent the input end of the oven and the maximum top heat is adjacent the delivery end of the oven.

The oven of the invention can have the following advantages:

(a) the oven provides the heating pattern normally required for bread and many other bakery products, namely a falling input along the bottom of the oven and a rising input along the top. As the single gas heating system is operated with a generally falling temperature throughout the circuit, and as the output end of the heating system is at a zone of the oven where a low temperature is required, the returning gases will be at a low temperature and the gas bleed will not deprive the system of too much energy. Thus the oven can have good energy utilisation and can provide an energy running cost saving of around 10% relative to a comparable modern three-section "Turboradiant" oven (generally as in GB 1 212 525) and of up to around 20% relative to a comparable oven of G B 382 266. Virtually all the gas flow in the heating system can be longitudinal, significantly reducing the system resistance, and it is found that for an oven about 30 meters long, the gas heating system can be operated with a pressure drop of about 25 millebars.

(b) a single basic heating system can be provided for the whole oven, replacing two, three or more systems, and reducing manufacturing costs. In fact, it is found desirable to have a relatively large first heater so as to provide higher temperature gases at the input end of the circulatory heating system, and considering an oven of the present invention against a comparable modern three-section "Turboradiant" oven, the first heater can have almost double the capacity of each of the "Turboradiant" heaters and the further heaters, four in number, can have a capacity of about half of that of each "Turboradiant" heater. In general, it is found desirable to operate the heaters at 65-70% of their maximum output, so that their maximum output can be used for rapid heat-up. This can increase the manufacturing costs of the heaters, but the oven as a whole can be cheaper due to the simplified gas flow system.

(c) the gas circulation system can be arranged to circulate low volumes of gases and thus require significantly less fan power against a comparable modern three-section "Turboradiant" oven; for instance an oven according to the invention having a length of about 30 meters can have a gas circulation of only about 500 m$^3$/min. compared to about 2400 m$^3$/min. for the "Turboradiant" oven.

(d) the use of a single heating system enables the flow system to be simplified so that less maintenance is required and fewer fans and motors need be used; the system can be designed to have no dampers and no balancing vanes, so that there is a very low system resistance and gas flow can be achieved with low pressure drops.

(e) the oven of the invention enables very flexible heat control to be performed because it is possible to have independent top and bottom heat and independent top and bottom zone lengths. The heating gases are fed from one zone to the next zone and their temperature can be monitored and used to control the further heater(s) automatically. Thus the further heater(s) can be modulated (preferably all the heaters are modulating), or switched off, or cold air can be blown in at the position of the heater; as a further possibility, a zone of the oven, such as the delivery end, can be partially or completely by-passed.

The first heater in the system can be adjacent the input end of the oven and be of much larger capacity than the, or each, further heater. Such an oven can have general applicability for bakery products, and the first burner can have 75% of the heating capacity of the whole oven. However, for special purposes, other arrangements can be used.

There may be a single bleed from the heating system. Such an arrangement enables a single flue to be used for the whole oven heating system, facilitating the use of heat recovery schemes.

The oven may have a first heater adjacent the input end of the oven, and at least one further heater spaced downstream of the first heater, the further heater(s) comprising one or more burners positioned immediately to the side of and above or below the baking area of the oven, injecting transversely of the path of travel through the oven into the circulating gases of the heating system, the, or each, such burner injecting into a perforated distribution cylinder extending transversely across the path of gas flow in the heating system. Such an oven provides even heating across the oven—without the distribution cylinders, it is hard to provide even distribution of heat across the oven.

DESCRIPTION OF PREFERRED EMBODIMENTS OF THE INVENTION

The invention will be further described, by way of example, with reference to the accompanying drawings, in which:

FIG. 1 is a schematic side elevation of an oven in accordance with the invention;

FIGS. 2a and 2b show two alternative constructions for the first or feed end zone of the oven, in side elevation on a larger scale;

FIG. 3 shows a construction for the second zone of the oven, in side elevation;

FIG. 4 shows a construction for the third or delivery end zone of the oven, in side elevation.

Figure 2B:
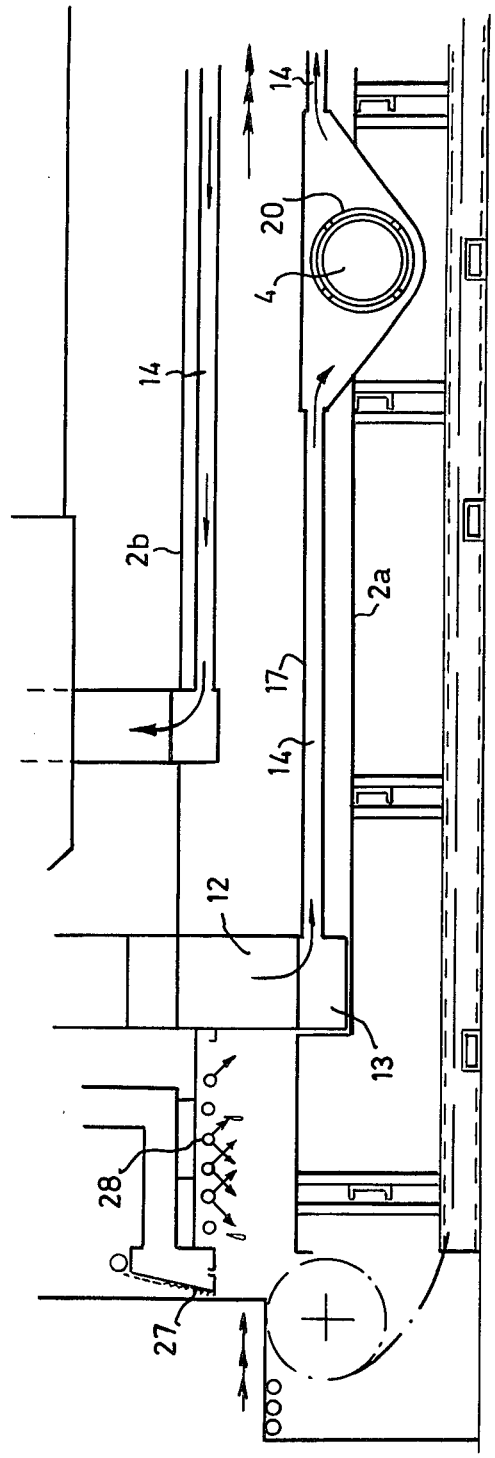

FIG. 3 overlaps FIG. 2a or 2b and FIG. 4 to a certain extent. Throughout the drawings, the single-headed arrows indicate the heating (combustion) gas flow, the double-headed arrows indicate the circulatory air flow and the treble-headed arrows indicate the movement of the products; the arrows indicating the gas and air flows are only rough indications of the direction of flow.

The oven is a multi-zone, indirect-fired, travelling baking oven of the tunnel type, having a conveyor means in the form of a single circulating wire band conveyor 1, the bottom of the tunnel-like baking chamber being defined by a floor 2a and the top of the oven chamber being defined by a roof 2b. The oven has gas duct means defining a single closed-circuit gas heating system which heats substantially the whole length of the oven and which is fired by a first or main heater 3 and a number of further heaters 4, 5, 6 and 7 downstream of the first heater in the direction of gas flow in the heating system. The general nature of the circulatory gas system can be seen in FIG. 1, and it will be observed that all the gas flows are substantially longitudinal for the whole length of the oven, apart from returns at the ends of the oven and divergencies adjacent the heaters 3–7, the gas flow being along the bottom of the oven and then back along the top. The first heater 3 is of much larger capacity than the further heaters 4–7, and to give an example, the first heater 3 can have a capacity of $0.725 \times 10^6$ K.cals per hour whilst the further heaters 4–7 can each have the same capacity of $0.2 \times 10^6$ K.cals per hour. There is a single bleed 8 at the downstream end of the heating system, which can be connected to a suitable flue and heat recovery device.

Details of the main heater 3 can best be seen in FIG. 2a. The main heater 3 has a burner 9 which discharges hot combustion gases into an unperforated heater tube 10. Fan means in the form of a roof-mounted recirculating fan 11 draws the return gases from the heating system and discharges them into the annular space around the heater tube 10, the return gases mixing with the hot burner gases before entering an inlet duct 12 which feeds a bottom header 13.

Figure 5:
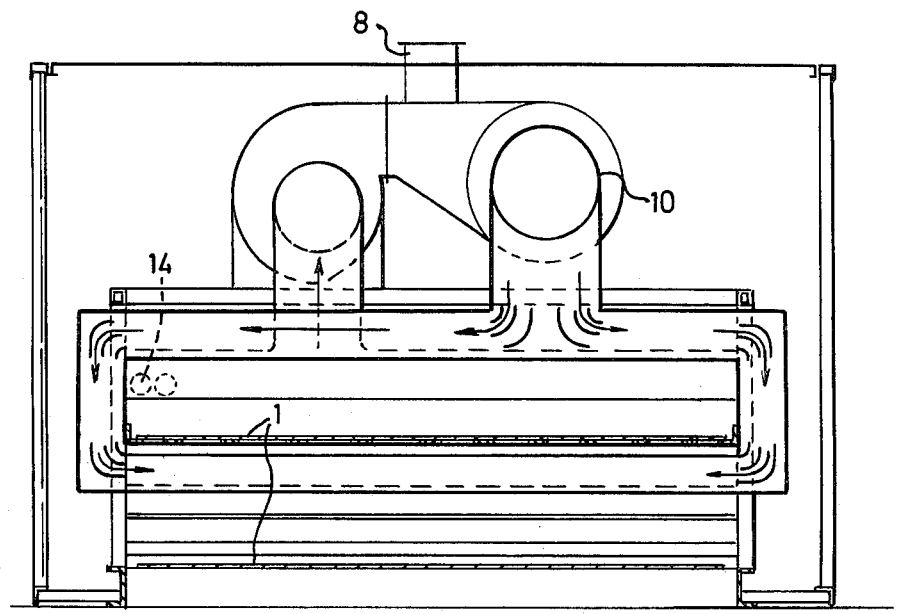
FIGS. 5 to 8 are vertical sections along the lines V—V in FIG. 2a and VI—VI, VII—VII and VIII—VIII in FIG. 4 (the lines are also indicated in FIG. 1).
Figure 7:
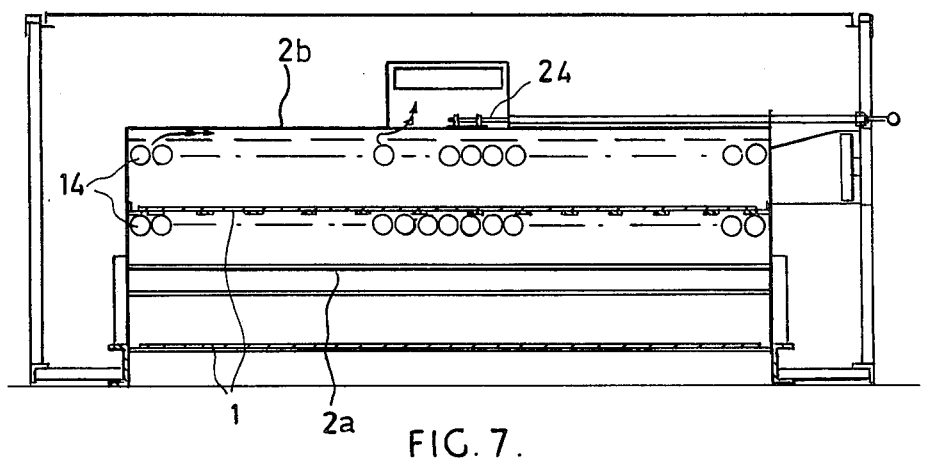
Figure 8:
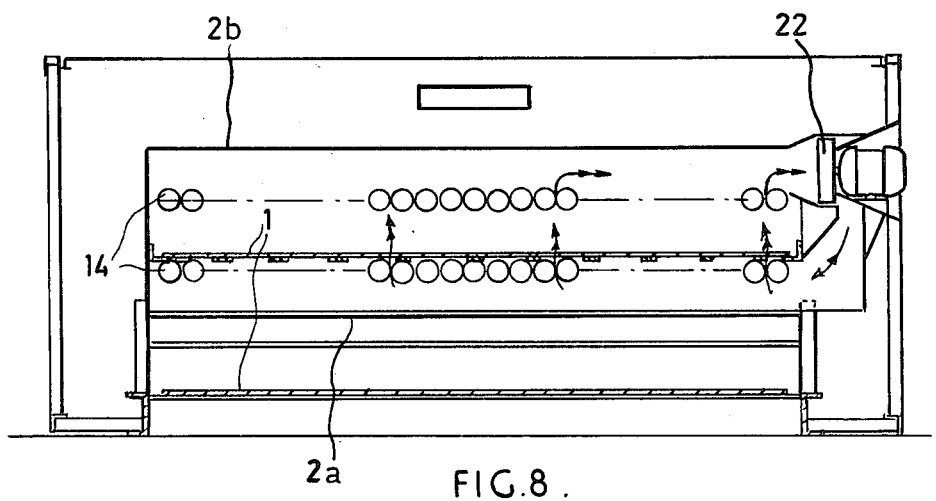

In general, the radiators in the oven are in the form of parallel longitudinal tubes 14 which can be seen for instance in FIGS. 5, 7 and 8, the tubes 14 being close together but with slight air gaps therebetween. However, the first radiator 15 in the alternative of FIG. 2a may be either a box type or tubular type, dependant on the type of conveyor 1 used and the product being baked. Generally a box-type radiator 15 would be used with a wire head for "oven bottom" products which rest directly on the conveyor 1, whilst the tubular-type radiator would be used with a grid sole type conveyor (not as illustrated) on which tinned products are conveyed.

Specifically referring to FIG. 2a, part of the hot gases from the bottom header 13 are passed rearwards into the first radiator 15 and a bottom pre-heat radiator 16 for pre-heating the conveyor 1.

The arrangement is different in FIG. 2b, where all the gases pass forwards from the bottom header 13 into a first radiator 17.

Figure 6:
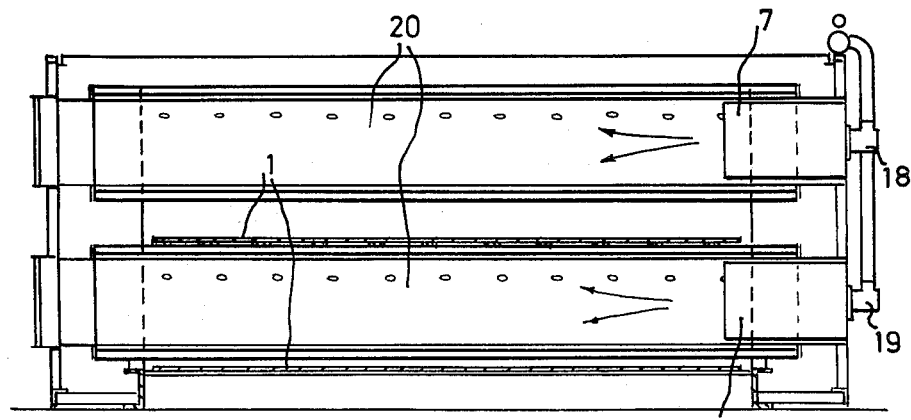

FIGS. 3 and 4 and 6 give good illustrations of further heaters 5, 7 which are immediately below and above the baking area and are fired by burners 18, 19 which are immediately to the side of and below and above the baking area, injecting transversely of the path of travel of the products through the oven into a respective perforated heater tube 20 which extends transversely across a path of gas flow in the heating system. Adjacent each heater tube 20, the individual tubes 14 of the radiators connect with a header which extends for the whole width of the oven chamber and contains the respective heater tube 20.

At the delivery end of the oven (see FIG. 4), the circulating gases are taken through ducts 21 at the sides of the oven chamber to the top of the oven, and then they travel back to the re-circulating fan 11 through top radiators and passing over further heater tubes 20.

There are no dampers and no balancing vanes throughout the hot re-circulating gas system. The quantity of heat released in determined by regulating the temperature of the mass circulation (which mass is substantially constant), specifically by regulating the further burners 4–7 whilst keeping the heat output of the main burner 3 constant. In practice; very little heat is required from the further burners 4–7 for bakery products such as bread as they require a falling heat on the bottom and a rising heat on the top as they travel through the oven, and the system can utilise to the full, the heat remaining in the gases from the previous zone. Automatic temperature controls (not shown) are incorporated.

The burners and heaters can be as described in GB 707 750.

Convection fans 22 are provided for circulating the oven chamber atmosphere over the radiator tubes 14, as shown in FIG. 8. The circulation can be upwards (as shown) or downwards, depending on the direction of rotation of the convection fan 22, and the convection fans 22 are positioned on alternate sides of the oven to obtain as even a flow of air as possible.

Alternatively convection or turbulence fans feeding a system of blowing tubes can be provided generally as described in GB 1 212 525 for circulating the oven chamber atmosphere over and between radiator tubes 14. By this method the application of convection can be both upwards and/or downwards depending on the damper settings in that system.

An extraction fan 23 (see FIG. 4), connected to the centre part of the oven chamber by way of a mechanically-controlled damper plate 24 (FIG. 7), is provided for extracting air and steam from the oven chamber, and is also connected to a withdrawal duct 25 for preventing excessive emission of fumes from the delivery end of the oven. A further extraction fan 26 and extraction duct 27 prevent excessive emission of fumes at the feed end of the oven, and steam for gelatinisation is provided by blowing steam in through perforated transverse tubes 28 at the feed end of the oven (see FIGS. 2a and 2b).

For a product such as bread, the gas in the gas circulating system can drop from the temperature of about 690° C. to a temperature of about 240° C., the latter being the temperature at the bleed 8.

I claim:

1. A multi-zone, indirect-heated, travelling baking oven, comprising: means defining a tunnel-like baking chamber; means for conveying articles to be baked through the baking chamber along a path of travel from an input end thereof to a delivery end thereof; gas duct means defining a closed-circuit gas heating system and conducting the gas flow beneath at least the major part of said path to adjacent said delivery end and then back above at least the major part of said path; fan means for passing said gas flow around said gas duct means beneath said path generally in the same direction as said conveying means and above said path generally in the opposite direction to said conveying means; and at least two heaters associated with said duct means for heating the gas in said heating system and spaced apart in the direction of gas flow in said heating system, one said heater being adjacent said input end of the oven and of much larger capacity than the, or each, further said heater, whereby the temperature generally falls throughout said heating system for adjacent said input end below said path to adjacent said input end above said path and the maximum bottom heat is adjacent said input end and the maximum top heat is adjacent said delivery end, thereby providing a multi-zone, indirect-heated baking chamber.

2. The oven of claim 1, wherein there is a plurality of said further heaters, all of which are of substantially the same capacity.

3. The oven of claim 1, wherein said gas duct means conducts all gas flows in the heating system substantially longitudinally for the whole length of the oven or of the part heated by the heating system, apart from returns at at least one end of the oven or part and divergencies adjacent the heaters.

4. The oven of claim 1 or 3, wherein said gas duct means comprise longitudinal tubes over which circulating fans circulate the oven atmosphere.

5. The oven of claim 1, wherein there is a single bleed from the heating system.

6. The oven of claim 1, or 3, wherein the, or each, said further heater comprises a burner positioned immediately to the side of and above or below said baking chamber, injecting transversely of the path of travel through the oven into the circulating gases of the heating system, a perforated distribution cylinder being associated with the said burner of said further heater and extending transversely across the path of gas flow in said heating system, said burner injecting into said distribution cylinder.

7. A multi-zone, indirect-heated, travelling baking oven defining a baking area through which articles to be baked will follow a path of travel longitudinally from an input end to a product delivery end; an oven conveyor mechanism having an article conveying run extending between upper and lower longitudinal portions of the oven and driven in a direction to deliver articles to be baked from the input end to the delivery end; heating means for the oven comprising a closed-circuit gas heating system which heats at least the major part of the length of the oven, which system comprises gas duct means extending longitudinally along the bottom of the oven below said run to adjacent the delivery end and then longitudinally back along the top of the oven above said run to so conduct the gas flow in a circuit closed to the oven atmosphere, and at least two heaters which are spaced apart in the direction of gas flow in the heating system and communicate with the gas duct means, the heaters being of such capacity and so disposed as to cause the temperature generally to fall throughout the circuit whereby the maximum bottom heat is adjacent the input end of the oven and the maximum top heat is adjacent the delivery end of the oven.

* * * * *